United States Patent [19]

Vea

[11] Patent Number: 4,924,428
[45] Date of Patent: May 8, 1990

[54] REAL TIME DIGITAL SIGNAL PROCESSOR IDLE INDICATOR

[75] Inventor: Matthew J. J. Vea, Rowlett, Tex.

[73] Assignee: Northern Telecom Limited, Montreal, Canada

[21] Appl. No.: 130,153

[22] Filed: Dec. 8, 1987

[51] Int. Cl.⁵ .............................................. G04F 10/00
[52] U.S. Cl. .................................. 364/900; 364/921.8; 364/942.7; 364/946.2; 364/946.9; 364/569
[58] Field of Search ... 364/579, 580, 569, 200 MS File, 364/900 MS File, 200, 900; 371/15, 16, 19, 28, 29

[56] References Cited

U.S. PATENT DOCUMENTS

| | | | |
|---|---|---|---|
| 3,623,007 | 11/1971 | Eckhart et al. | 364/200 |
| 3,771,144 | 11/1973 | Belady et al. | 364/200 |
| 3,818,458 | 6/1974 | Deese | 364/200 |
| 4,030,072 | 6/1977 | Bjornsson | 364/200 |
| 4,126,895 | 11/1978 | Weemaes et al. | 364/200 |
| 4,432,051 | 2/1984 | Bogaert et al. | 364/200 |
| 4,517,671 | 5/1985 | Lewis | 371/19 |
| 4,677,580 | 6/1987 | Saluski | 364/569 |
| 4,713,791 | 12/1987 | Saluski | 364/900 |

OTHER PUBLICATIONS

Z80 Assembly Language Programming by Lance Leventhal, 1979, pp. 11-8 to 11-10.

Primary Examiner—Gareth D. Shaw
Assistant Examiner—P. V. Kulik
Attorney, Agent, or Firm—Nixon & Vanderhye

[57] ABSTRACT

Instructions in the processor idle loop are used to measure the percentage of time the processor is at idle. The processor idle loop instructions control the processor to alternate a processor data output between output states. The processor data output thus alternates between states whenever the processor is idle, and remains in the same state when the processor is performing useful tasks. A frequency counter or other indicating device responsive to the rate of processor data output state change directly indicates the amount of time the processor is idle relative to the total amount of processing time. Since the change of state, not the state itself, of the data output is detected, it does not matter what state the data output is left in when the processor is interrupted from performing the idle loop instructions.

22 Claims, 2 Drawing Sheets

IDLE LOOP

REAL TIME DIGITAL SIGNAL PROCESSOR IDLE INDICATOR

FIELD OF THE INVENTION

This invention relates to arrangements which measure the loading of a digital signal processor.

BACKGROUND AND SUMMARY OF THE INVENTION

The need often arises to measure the available processing capacity of a computer. Digital signal processors (e.g., microprocessors) have become commonplace in virtually every type of electronic equipment. Such processors can be used to perform a variety of functions. The flexibility provided by a processor is often advantageously used to augment the functions provided by a system, or to perform those functions using complex algorithms.

As a simple illustration, suppose one is designing a band pass filter for speech signals in a communications system. An analog bandpass filter constructed using operational amplifiers, resistors, and capacitors is one design option that is quite cost effective and provides suitable performance in many applications. To increase flexibility and performance, however, one might choose digital filtering techniques instead of analog techniques. In digital filtering, the filter characteristics are determined not by the values and configurations of amplifiers, resistors and capacitors, but by the program control steps performed by a digital signal processor (e.g., a microprocessor or some other device capable of processing digital signals). The filtering characteristics of a digital filter (e.g., frequency roll-off, "corner" frequencies, and the like) may be changed simply by modifying the programming executed by the processor—adding tremendous flexibility to the system.

There is typically a desire to take advantage of the capabilities of the processor to the fullest extent possible. The same processor used to perform the filtering can also be used to perform other related (and even unrelated) functions. For example, it may be desirable to use the processor to generate signaling tones for various applications, to provide system status information (e.g., to illuminate indicators or drive alphanumeric displays), to receive and process user commands, or the like. The processor can be used to perform far more complex filtering and other functions than could be performed cost effectively with analog circuitry.

Unfortunately, not all program code is as efficient as it could be, and even efficient code performing complex functions in real time can cause excessive processing loading. Processors have minimum "cycle times" (the time the processor requires to execute a single program control instruction). In the digital filtering example, the processor must process incoming signals in real time in addition to performing any "overhead" and other tasks. Processor "loading" (typically measured in percentage of maximum loading) depends upon the incoming data rate, the efficiency and complexity of the program control software, and the speed of the processor.

As a simple example, suppose the processor is capable of executing an instruction every microsecond ($10^{-6}$ seconds) and the incoming signal to be filtered is sampled once every millisecond ($10^{-3}$ seconds). Suppose further that the filtering software performs an average of 500 instructions on each incoming sample—requiring a total time of $500 \times 10^{-6}$ seconds $= 0.5$ milliseconds of processing time for each sample. Processor loading would then be approximately 50% (or perhaps slightly above 50% due to additional overhead tasks the processor must perform). If the incoming signal sampling rate is increased to one sample every 0.5 milliseconds, the processor loading will increase to around 100%.

Excessive processor loading is potentially extremely detrimental. In the filtering example, excessive loading of the processor may cause data to be lost and/or introduce inaccuracies in the filtering process. If the processor is fully but not excessively loaded by its real time processing functions, it may have insufficient additional capacity to perform other functions it is called upon to perform. On the other hand, faster processors are typically much more expensive (and may not even be available in some applications), and in a cost effective design it is generally desirable to use components having capabilities on the same order as the demands placed upon them.

Unfortunately, it is not always possible to accurately predict how much loading a given processor will experience while performing given real time functions. Typical complex algorithms perform a variable number of instructions on input data depending upon factors which may be difficult or impossible to accurately take into account. Computer simulations are helpful, but since they can only simulate actual operating conditions they may be inaccurate. It is therefore preferable to actually measure processor loading under various different operating conditions.

Diagnostic programs which run concurrently with a processor's normal programming in order to measure processor loading are generally known. This type of diagnostic program may be called by an operating system program (if one is provided), or alternatively, may be interrupt driven and called periodically (e.g., whenever a timer times out). The diagnostic program may measure various parameters of processor loading (e.g., count processor cycles, and/or read the contents of processor work areas such as status register, stack contents, and the like) and, based on these (and other) parameters, calculate an indication of instantaneous or average loading. A history of such indications may be stored and analyzed to provide a measure of processor loading under various operating conditions.

Unfortunately, such diagnostic programs are generally complex and typically themselves add significantly to processor loading—causing the indications they provide to be inaccurate in some circumstances and adding to processor loading during measurements. A program which determines processor loading by counting processor cycles may underestimate the loading of a very busy processor because the processor may have insufficient resources to increment the cycle counter. A further shortcoming of such diagnostic programs is that they attempt to estimate how much of the time a processor is busy—whereas in most cases a more relevant inquiry is how much time the processor is not busy (and is therefore available to perform additional tasks).

It would be highly desirable to provide a cost effective arrangement which measures average processor loading and yet is non-invasive in that it is completely transparent to the operation of the processor (i.e., does not itself add to processor loading). Such an arrangement would be even more useful if it were capable of directly measuring the amount of available processing capacity under a variety of different operating conditions.

The present invention provides these and other advantageous features by including diagnostic instructions in the processor "idle loop."

A processor does not cease performing instructions when it is not busy, but instead jumps or "traps" to a so-called "idle loop" whenever it is idle. The idle loop generally consists of instructions which perform no useful function (e.g., "no operation," delay and/or jump instructions). When the processor must perform a function, it receives an "interrupt"—at which time it ceases performing instructions in the idle loop and begins performing other, useful program control instructions. The next time the processor has no further tasks to perform, it once again returns to its idle loop.

The present invention includes instructions in the processor idle loop which control the processor (or external circuitry associated with the processor) to measure the amount (or percentage) of time the processor operates in the idle loop. In the preferred embodiment, instructions in the processor idle loop control the processor to alternate a processor data output between output states. The processor data output alternates between states whenever the processor is idle, and remains in the same state when the processor is performing useful tasks. A frequency counter or other indicating device (e.g., a light emitting diode) responsive to the rate of processor data output state change may be used to directly indicate the amount of time the processor is idle relative to the total amount of processing time.

Since the change of state, not the state itself, of the data output is detected, it does not matter what state the data output is left in when the processor is interrupted from performing the idle loop instructions (by design, the priority associated with executing idle loop instructions is lower than the priority associated with executing any other instruction).

Because the processor performs the idle loop instructions only when it has nothing else to do, the additional idle loop instructions add nothing to processor loading and the load detecting arrangement accordingly is completely transparent to the operation of the processor. Moreover, the idle loop instructions directly measure the amount of time the processor spends in an idle state relative to the total amount of processing time—and therefore provide an extremely useful, direct indication of spare processing capacity. These advantages are all provided by an arrangement which adds only minimal cost to the processor system.

These and other features and advantages of the present invention may be better and more completely appreciated by referring to the following detailed description of presently preferred exemplary embodiments in conjunction with the appended sheets of drawings, of which:

DETAILED DESCRIPTION OF THE DRAWINGS

Figure 1:
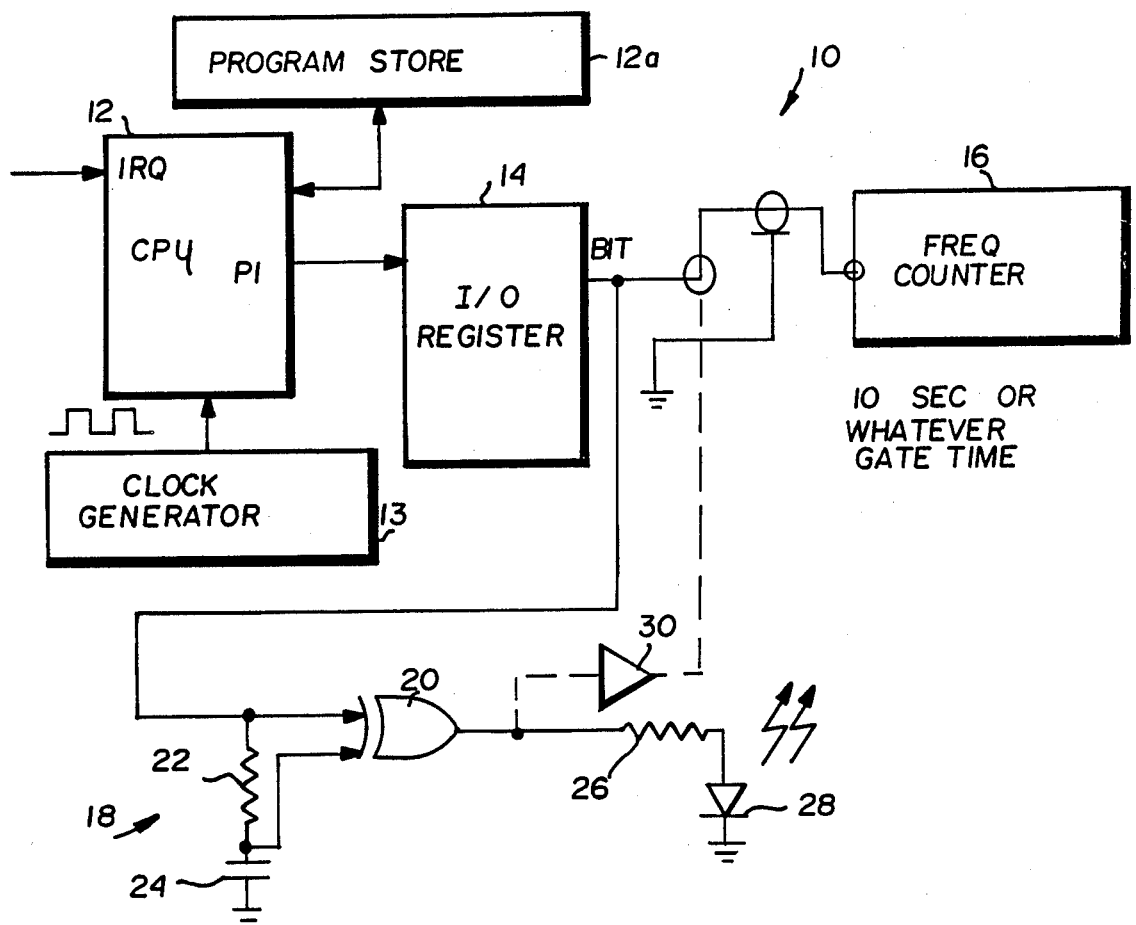
FIG. 1 is a schematic block diagram of a presently preferred exemplary embodiment of the present invention.

FIG. 1 is a schematic block diagram of the presently preferred exemplary embodiment of a digital signal processing system 10 in accordance with the present invention. System 10 includes a central processing unit ("CPU") or processor 12. Processor 12 may, for example, be a conventional microprocessor including a read only memory program store 12a, internal registers and an arithmetic logic unit, etc.—or virtually any other type of device which processes digital signals. A conventional clock signal generator 13 produces a periodically-alternating digital clock synchronization signal which drives processor 12. The frequency (that is—the period) of this clock signal determines the time it takes for the processor 12 to execute each of its program control instructions.

In the preferred embodiment, processor 12 may be connected to a variety of associated conventional external circuits which perform various desired functions. For example, if processor 12 is to be used to provide digital filtering, it may be connected to the output of an analog-to-digital converter or other source of digitized signals (not shown). Processor 12 may also be connected to display devices, input/output peripheral devices, or virtually any of the thousands of different devices designed to be interfaced with a processor (all as is well known to those skilled in this art).

In the preferred embodiment, processor 12 includes at least one unused data output connection P1 which is connected to the input of a conventional input/output (I/O) register 14. I/O register 14 is sensitive to the "edges" (transitions) of the P1 output of processor 12 and produces an output signal "BIT" which changes state in response to those edges. In the preferred embodiment, register 14 buffers the signal outputted at the processor P1 data output, but does not alter the frequency of that signal (and may but need not necessarily synchronize the signal to the processor clock).

The register 14 "BIT" output is connected to the input of a frequency counter 16 operating as an event counter with a fixed gate time (of, e.g., 10 seconds). The "BIT" signal output of register 14 is also connected to a visual indicating circuit 18 (which can conveniently be provided on the same board as processor 12) providing a rough visual indication of processor idle percentage.

Indicating circuit 18 in the preferred embodiment includes an exclusive OR ("XOR") gate 20 the inputs of which are connected across a resistor 22. The "BIT" signal is connected to a first input of XOR gate 20, and a second input of the XOR gate is connected through a capacitor 24 to ground potential. This input configuration of XOR gate 20 causes the XOR gate to produce a pulse whenever a transition occurs in the "BIT" output signal (since the XOR gate first input immediately changes levels to track a level change of the "BIT" signal, but the gate second input changes state only after a delay determined by the RC time constant of resistor 22 and capacitor 24).

The output of XOR gate 20 is connected through a current limiting series resistor 26 to the anode of a light emitting diode (LED) 28—the LED cathode being connected to ground potential. An optional driver/buffer amplifier 30 may be used to connect the output of XOR gate 20 to the frequency counter 16 input in lieu of a direct connection between the counter input and the register 14 "BIT" signal output.

As will be understood by those skilled in the art, it is not necessary to provide both frequency counter 16 and indicating circuit 18 in the preferred embodiment, since both are used to indicate the same information. In the preferred embodiment, frequency counter 16 is only connected when an exact load measurement is desired, while indicating circuit 18 is continuously connected to I/O register 14 so as to provide a constant visual indication of processor idle percentage.

Figure 2:
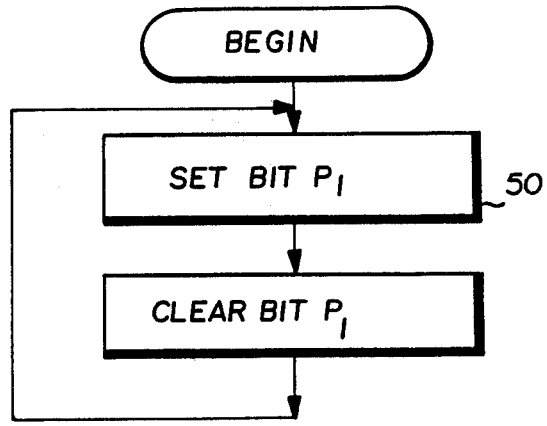
FIG. 2 is a schematic flowchart of exemplary program control steps executed by the processor shown in FIG. 1 during idling.

FIG. 2 is a schematic flowchart of exemplary program control steps performed by processor 12 whenever the processor is in an idle state. In the preferred embodiment, processor 12 executes a section of code beginning at a predetermined address (of its associated read only memory program store 12a) whenever it is at idle and is not required to perform useful tasks. Program control instructions specifying the tasks shown in the FIG. 2 flowchart are loaded into the program store 12a beginning at that predetermined address and are therefore executed whenever processor 12 is at idle.

Processor 12 is "interrupt driven" in the preferred embodiment, meaning that it begins executing program control instructions stored in a portion of program store 12a other than that portion storing the instructions executed during idle in response to the occurrence of an external event (e.g., receipt of input data to be processed). Typically, a device external to processor 12 (e.g., a conventional I/O controller not shown) produces a signal which is applied to a processor interrupt request (IRQ) input. The presence of an active signal level on this interrupt request input causes the microprocessor to cease executing the "idle" routine and to "trap" to an interrupt handler routine stored in a different portion of program store 12a. The interrupt handler routine either itself performs desired processing (e.g., to process the input data which caused an I/O interrupt to be generated) or alternatively, transfers program to additional routines (also stored in program store 12a) which perform the desired processing. When processing is completed, processor 12 once again returns to executing the idle routine.

The FIG. 2 idle routine is very short in the preferred embodiment. A first step 50 writes a logic level one to processor data output connection P1. A second step 52 writes a logic level zero to the processor data output connection P1. The routine then jumps back to the first step 50 to repeat steps 50, 52.

The following are exemplary mnemonic instructions for performing the steps shown in the

| FIG. 2 flowchart: | |
|---|---|
| ADDRESS | INSTRUCTION |
| X | Set P1 |
| X + 1 | Reset P1 |
| X + 2 | Jump to Address X |

The steps shown in the FIG. 2 routine form an endless loop that causes processor data output P1 to "toggle" (that is—alternate between binary values 0 and 1) at a rate proportional to the processor clock rate whenever the processor 12 is idling, and causes data output P1 to remain constant when the processor is performing useful tasks. For example, assume processor 12 has a one megahertz clock frequency, executes the "set" and "reset" commands each in one cycle time (one microsecond), and executes the "jump" command in two cycle times (two microseconds). The total time required to execute the "idle loop" consisting of these three instructions one time is four microseconds, and a single loop execution will cause data output P1 to alternate once between logic level 0 and logic level 1 (e.g., from 0 to 1 to 0, or from 1 to 0 to 1)— resulting in a signal of one-quarter the processor clock frequency being generated whenever (and only when) the processor has nothing to do and is idling.

The signal present on the processor P1 output does not have a 50% duty cycle in the preferred embodiment even when processor 12 is 100% idling and the idle endless loop steps shown in FIG. 2 are performed continuously. This is because the P1 output state remains constant during the time processor 12 executes the "jump" instruction. In the preferred embodiment, the P1 output rises to logic level 1 only while processor 12 executes the "reset" instruction (that is, during the processor cycle immediately after the "set" instruction has been performed). The P1 output then falls to logic level 0 immediately after the "reset" instruction executes—and remains at logic level 0 during the time the "jump" instruction is executed as well as during the time the "set" instruction is performed. It is for this reason that frequency counter 16 (and indicating circuit 18) is sensitive to transitions in the "BIT" signal rather than to some other characteristic of that signal.

Frequency counter 16 in the preferred embodiment directly indicates the percentage of time processor 12 is idle relative to the total processing time by counting edges of the signal "BIT" produced by I/O register 14. If the processor is 100% idle, then edges (e.g., leading edges) will occur at the rate of 1/T where T is the time required by processor 12 to execute the idle loop instructions once (e.g., 4 microseconds in the example given above—which equals the time required to perform a set bit instruction+the time required to perform a reset bit instruction+the time required to perform a jump instruction in the preferred embodiment). As the processor 12 does more and more real work, it spends less time executing the idle loop instructions—and the edges occur proportionately less often in direct ratio to the amount of idle time which remains.

Figures 3A, 3B:
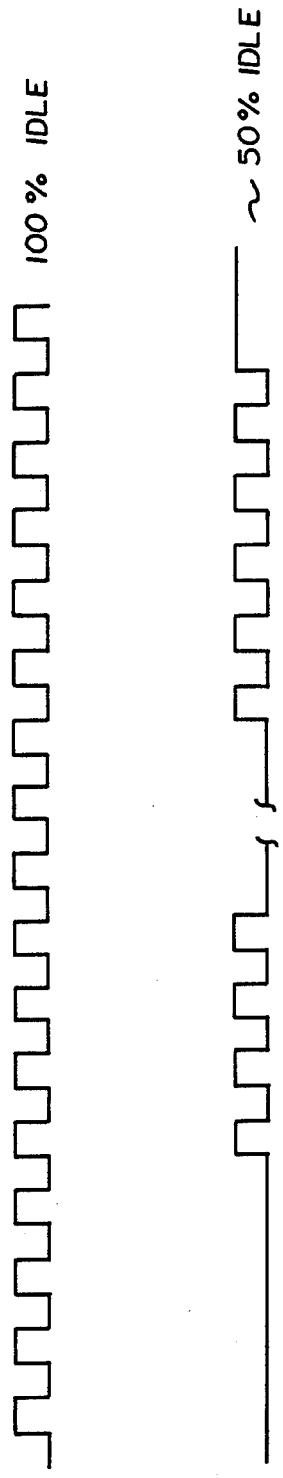
FIGS. 3A and 3B are exemplary load-indicating output waveforms produced by the processor shown in FIG. 1.

Assume, for example, that frequency counter 16 receives one pulse (edge) every 4 microseconds when processor 12 is 100% idle (as described in the example above). Suppose frequency counter 16 has a gate time of 10 seconds (selected to provide a desired degree of averaging over time). With processor 12 100% idle, frequency counter 16 will count $2.5 \times 10^6$ pulses (edges) over the ten second gate time (one pulse every 4 microseconds means 250,000 pulses every second, or 2.5 million pulses every ten seconds). Note that it is helpful for this calculation to know (at least approximately) the relationship between the processor clock frequency and the gate time, as well as the number of clock cycles required to execute the idle loop in its entirety. A waveform of the "BIT" signal for 100% idling of processor 12 is shown in FIG. 3A.

Suppose frequency counter 16 counts $1.25 \times 10^6$ pulses (edges) during its ten second gate time. This count indicates that over the ten second gate time, processor 12 was 50% idle on the average. As is shown in FIG. 3B, this 50% idling condition does not halve the instantaneous frequency of the "BIT" signal. Rather, the "BIT" signal is generated at substantially the same frequency whenever processor 12 is idling in the preferred embodiment. However, processor 12 ceases to produce the "BIT" signal altogether during times when it is performing real work (i.e., useful tasks) rather than idling. When the frequency of the "BIT" signal is averaged (integrated) over a time period which is long relative to the time between processor clock pulses, the result is a highly accurate indication of average processor idle percentage.

The indication provided by LED 28 will obviously not provide as accurate an estimate of processor idle time as that provided by frequency counter 16. However, the LED 28 does provide an indicator which is also very helpful. If LED 28 is fully lit, processor 12 is nearly 100% idle (the LED will actually have an on-off duty cycle of about 50% under this condition, but the alternations are so rapid as to be undetectable by the human eye). If LED 28 is dark or nearly dark, processor 12 is 0% idle. If LED 28 is at half brightness compared to the 100% condition, processor 12 is operating at 50% idle.

In some applications it might be desirable to substitute a conventional frequency ratio detector for frequency counter 16. Such a detector may compare the ratio of the processor clock frequency to the frequency of the "BIT" signal to provide an indication of the percentage of processor time spent idling.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What I claim is:

1. An arrangement for measuring the percentage of time a digital signal processor is idle comprising:
    a digital signal processor having an output terminal and including means for executing program control instructions to perform predefined useful tasks;
    said digital signal processor further including idle loop executing means for executing idle loop program control instructions whenever said processor is not busy performing said useful tasks, said idle loop executing means for alternating the signal level at said digital signal processor output terminal between first and second binary levels whenever said processor is idling, for alternating the level at said processor output terminal at a rate over time which directly indicates the spare processing time of said digital signal processor, said digital signal processor maintaining said processor output terminal at a constant signal level whenever said processor performs said predefined tasks; and
    means external to said processor and connected to said processor output terminal for producing an indication of said spare processing time in response to the rate over time at which said processor alternates the signal level at said processor output terminal between said first and second binary levels.

2. An arrangement as in claim 1 wherein said indication producing means includes frequency counting means for counting the number of times said processor output terminal level alternates over a predetermined gate time.

3. An arrangement as in claim 1 wherein:
    said arrangement further includes clock generating means connected to said digital signal processor for controlling the rate at which said executing means executes said program control instructions and the rate at which said idle loop executing means continually alternates the level at said processor output terminal when said processor is idle; and
    said frequency counting gate time has a predetermined relationship to said controlled rate.

4. A real time digital signal processing system comprising:
    memory means for storing an idle loop program control routine and a further program control routine defining input signal processing tasks;
    a processor means connected to said memory means, also connected to receive externally generated input signals, and having a data output connection, for processing said input signals substantially in real time in accordance with said further program control routine and for performing said idle loop program control routine whenever not occupied processing said input signals, said idle loop program control routine causing said data output connection to continually alternate between first and second states during the time said processor is performing said idle loop program routine; and
    indicating means connected to said output connection for producing an indication of the percentage of time said processor performs said idle program control routine in response to changes in said data output connection state.

5. A system as in claim 4 wherein said indicating means includes means for counting the number of data output connection state changes over time.

6. A system as in claim 4 wherein said indicating means indicates the time said processor means performs said idle loop program control routine over time.

7. A system as in claim 4 wherein said idle loop program control routine defines:
    a first idle task which causes said processor data output connection to rise to a logic level 1;
    a second idle task which causes said processor data output connection to fall to a logic level 0; and
    a third idle task which causes said first and second idle tasks to be periodically executed whenever said processor is idle and is not performing said further tasks.

8. A system as in claim 4 wherein said indicating means includes optical indicating means for indicating the frequency of said data output connection state changes.

9. A system as in claim 4 wherein:
    said system further includes means for generating an alternating clock synchronization signal having a preset frequency, said processor means being connected to receive said clock signal and performing said idle and further tasks at a rate responsive to said clock signal; and
    said indicating means includes means for determining the ratio between the frequency at which said processor data output connection changes state and the clock signal frequency.

10. A system as in claim 4 wherein processing of said idle loop program control routine does not increase the effective loading of said processor means.

11. A system as in claim 4 wherein:
    said processor means is interrupt driven, receipt of an input signal causing said processor means to execute said further program control routine, said processor means performing said idle loop program control routine whenever no interrupt is occurring and performance of said further program control routine in response to previously received interrupts is completed.

12. A system as in claim 4 wherein said indicating means includes:
    an exclusive OR gate having first and second input terminals and an output terminal, said first input terminal being coupled to said processor means data output;
    a resistor connected between said exclusive OR gate first and second input terminals; and
    a capacitor connected between said exclusive OR gate second input terminal and ground potential.

13. A system as in claim 12 wherein said indicating means further includes a light emitting diode connected to said exclusive OR gate output terminal.

14. A system as in claim 4 wherein said processor data output changes state asymmetrically when said processing means is 100% idling.

15. A system as in claim 4 wherein said idle tasks cause said data output to change state at a preset instantaneous rate, the average rate at which said data output changes state being directly proportional to the duration said processor means performs said idle routine over time.

16. A digital signal processing system comprising:
    a digital signal processing means of the type which alternately operates in a busy state and in an idle state, said processing means for processing input signals applied thereto when operating in said busy state, said processing means for performing an idle loop routine when operating in said idle state, said processing means including means for producing a continually alternating binary valued output signal when said processing means is operating in said idle state; and
    indicating means connected to receive said output signal for indicating the percentage of time said processing means is operating in said idle state in response to the rate over time said output signal is alternated in response to said idle loop routine.

17. A digital signal processing method comprising:
    (1) operating a digital signal processor alternately in a busy state and in an idle state;
    (2) processing input signals with said processor whenever said processor operates in said busy state;
    (3) producing a continually alternating binary valued output signal directly at an output terminal of said processor under control of a processor idle loop routine only when said processor operates in said idle state; and
    (4) indicating the percentage of time said processor operates in said idle state in response to the average rate over time said output signal is alternated by said step (3).

18. A method as in claim 17 wherein said indicating step (4) includes counting the number of transitions of said output signal occurring during a preset gate time.

19. A method as in claim 17 wherein said indicating step (4) includes producing light every time said output signal changes value.

20. A method as in claim 17 further including:
    performing said processing step (2) in response to an interrupt request; and
    performing said producing step (3) after said processing step (2) finishes processing said input signals.

21. A method as in claim 17 wherein said producing step (3) includes:
    (a) applying a logic level 1 to a data output of said processor;
    (b) applying a logic level 0 to said processor data output; and
    (c) periodically repeating said applying steps (a) and (b).

22. A method as in claim 17 wherein said producing step (3) is performed under control of idle loop program control instructions.

* * * * *